(12) United States Patent
Sturm et al.

(10) Patent No.: US 10,760,032 B2
(45) Date of Patent: Sep. 1, 2020

(54) METHOD AND APPARATUS FOR REMOVING OIL FROM SEEDS

(71) Applicant: L'Air Liquide, Société Anonyme pour l'Etude et l'Exploitation des Procédés Georges Claude, Paris (FR)

(72) Inventors: Etienne Jean Sturm, Houston, TX (US); Ulrike Streiber, Frankfurt (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/281,856

(22) Filed: Feb. 21, 2019

(65) Prior Publication Data

US 2019/0256795 A1 Aug. 22, 2019

Related U.S. Application Data

(60) Provisional application No. 62/633,269, filed on Feb. 21, 2018.

(51) Int. Cl.
*C11B 1/10* (2006.01)
*B01D 11/02* (2006.01)
*B01D 3/14* (2006.01)
*B01D 5/00* (2006.01)

(52) U.S. Cl.
CPC ............... *C11B 1/10* (2013.01); *B01D 3/148* (2013.01); *B01D 11/0296* (2013.01); *B01D 5/00* (2013.01)

(58) Field of Classification Search
CPC .......... C11B 1/10; B01D 3/148; B01D 2/148; B01D 11/0296; B01D 5/00
USPC ......................................................... 554/13
See application file for complete search history.

(56) References Cited

U.S. PATENT DOCUMENTS 5,992,050 A * 11/1999 Kemper .................... F26B 3/00
34/237
2014/0110329 A1* 4/2014 Kemper ............... B01D 33/067
210/327

* cited by examiner

*Primary Examiner* — Deborah D Carr
(74) *Attorney, Agent, or Firm* — Elwood L. Haynes (57) ABSTRACT

A method for removing oil from seed flakes, including introducing seed flakes into an extractor, thereby producing an extracted seed flake stream and a miscella stream, introducing the extracted seed flake stream into a DTDC column, thereby producing a first solvent recycle stream and a seed meal stream, and introducing the miscella stream into a distillation system, thereby producing a second solvent recycle stream and a seed oil stream.

14 Claims, 7 Drawing Sheets

METHOD AND APPARATUS FOR REMOVING OIL FROM SEEDS

CROSS REFERENCE TO RELATED APPLICATIONS

This application claims the benefit of priority under 35 U.S.C. § 119 (a) and (b) to U.S. Provisional Application No. 62/633,269, filed Feb. 21, 2018, the entire contents of which are incorporated herein by reference.

BACKGROUND

Oil-bearing seeds can be broken up by grinding, flaking, or rolling, then subjected to various techniques, such as mechanical pressing, use of a solvent, etc., to liberate the oil.

SUMMARY

A method for removing oil from seed flakes, including introducing seed flakes into an extractor, thereby producing an extracted seed flake stream and a miscella stream, introducing the extracted seed flake stream into a DTDC column, thereby producing a first solvent recycle stream and a seed meal stream, and introducing the miscella stream into a distillation system, thereby producing a second solvent recycle stream and a seed oil stream.

DESCRIPTION OF THE INVENTION

Element Numbers

101=seed flakes
102=extractor
103=solvent
104=silo feed
106=DTDC column
107=airlock between extractor and DTDC
108=separate pre-desolventizer
109=miscella
110=distillation system
111=phase separator
112=first solvent recycle stream (from DTDC)
113=second solvent recycle stream (from distillation system)
114=first recycle heater
115=second recycle heater
201=extractor cells
202=conveyor chains
203=sprockets
204=cell wheels
205=rail
206=fixed solvent nozzles
207=upper, fixed slotted deck
208=lower, fixed slotted deck
209=drainage hoppers
210=final drainage hopper
211=top extraction chambers
212=bottom extraction chambers
213=cell beginning transition from upper extraction chamber to lower extraction chamber
214=cell completing transition from upper extraction chamber to lower extraction chamber
215=extracted seed flakes
401=hydrocyclones
402=filters
403=settling tank
502=pre-desolventizing stage (DTDC internal)
503=desolventizing and toasting stage
504=drier and cooler stage
505=rotating arm (DTDC internal)
506=deck fans
507=seed meal
509=DTDC shaft
510=Shaft motor
511=upper shaft support
512=air transfer ducts
601=electronic level control
602=rotary valve
701=absorption column
702=cold mineral oil
703=desorbed solvent stream
704=mineral oil/solvent mixture
705=stripping column
706=stripped solvent stream
707=mineral oil/solvent mixture
708=falling film evaporator
709=crude miscella
710=rising film evaporator
711=crude miscella
712=distillation column
713=crude oil In a preferred embodiment, oil is extracted from prepared seeds using continuous counter current extraction with an extraction solvent. In one embodiment, the extraction solvent may be hexane.

The seeds are processed by removing the hull and leaving the oil-containing meat. The hulls are removed from the process and the meat is crushed into seed flakes.

A transportable (sliding) cell or cell bed contains the seed flakes from which the miscella will be extracted, and transports the seed flakes from the first to the second extraction section. There is a slotted belt with bottomless cells circulating in the extractor. The bottom of the upper and lower part of the slotted deck is formed by two stationary slotted decks.

First inlet pipe communicates with first extraction section for introducing a first solvent therein, and, similarly, second inlet pipe communicates with the second extraction section for introducing a second solvent therein (the first solvent and the second solvent may be the same). Recovery pipe communicates with second extraction section to recover the solvent (miscella) that drained by gravity fed to the bottom of the extractor. Typically, the recovery pipe will be located in the floor of the extractor section. In preferred embodiments, to enhance the economics of the operation.

Typically, only the incoming, fresh solvent is heated. This requires that the recycled miscella 112/113 (below) be heated within the system to operate properly. This can delay start up by hours as everything heats up.

To enhance the efficiency of the extraction process, it is preferred that the seeds be rolled into thin flakes, and optionally be expanded with steam, using known techniques. The flakes may be screened during this process to remove fines.

Figure 1:
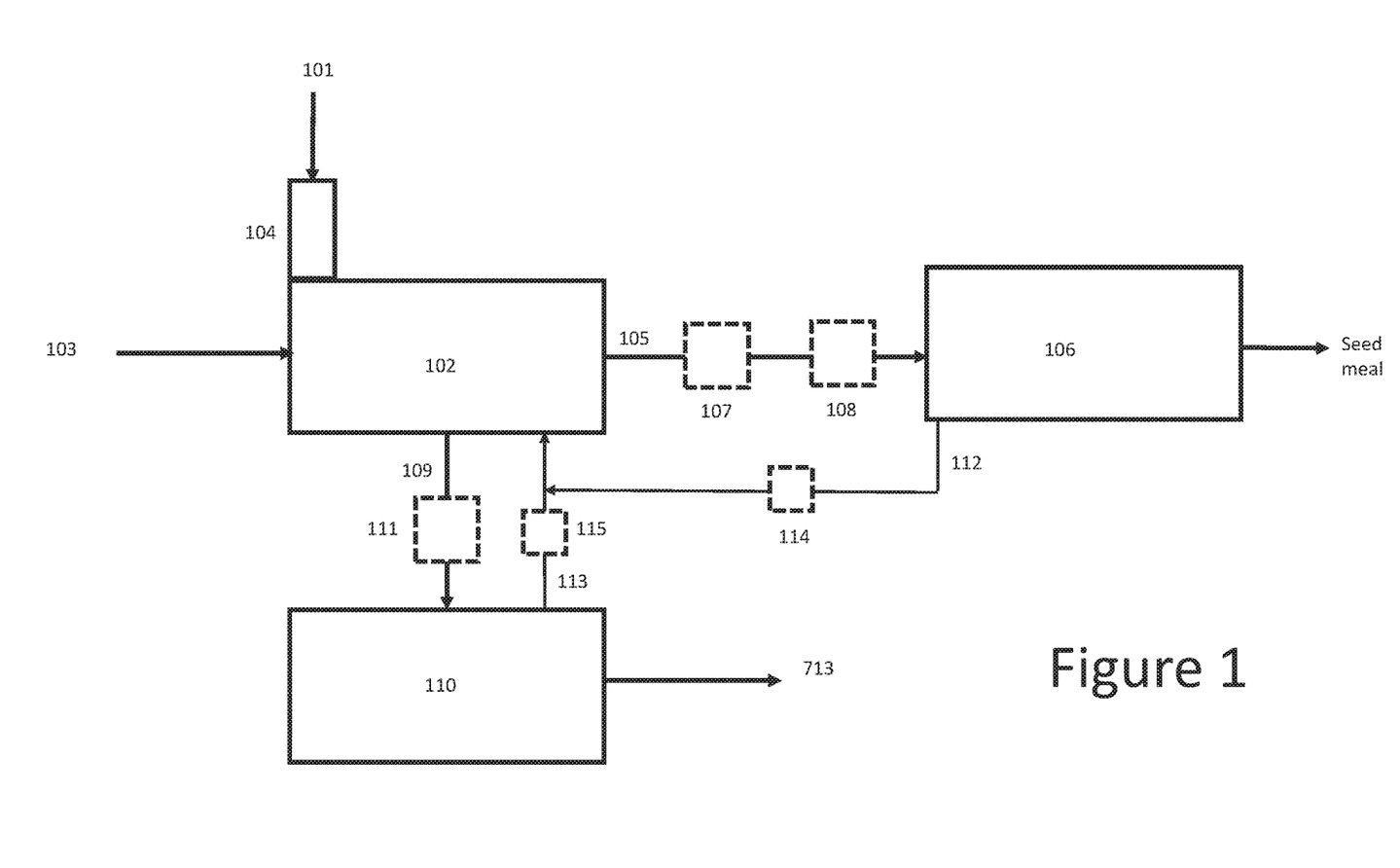
FIG. 1 is a schematic representation of the overall system in accordance with one embodiment of the present invention.

Turning now to the figures, oil extraction is accomplished by feeding the seed flakes 101 into a suitable extractor 102, preferably a counter current extractor. Extraction is preferably conducted using hot, hexane as the extraction solvent 103. This hot hexane may have a temperature of between 100 and 150 F, preferably between 115 and 125 F. Typically, a silo type feed 104 is used to supply the seed flakes 101 to the extractor inlet. The solvent 103 used in the extractor is typically highly volatile, and often hazardous, so the typical design simply utilizes the somewhat densely packed seed flakes in the silo itself to prevent the backflow of solvent vapors to the atmosphere.

Figure 2:
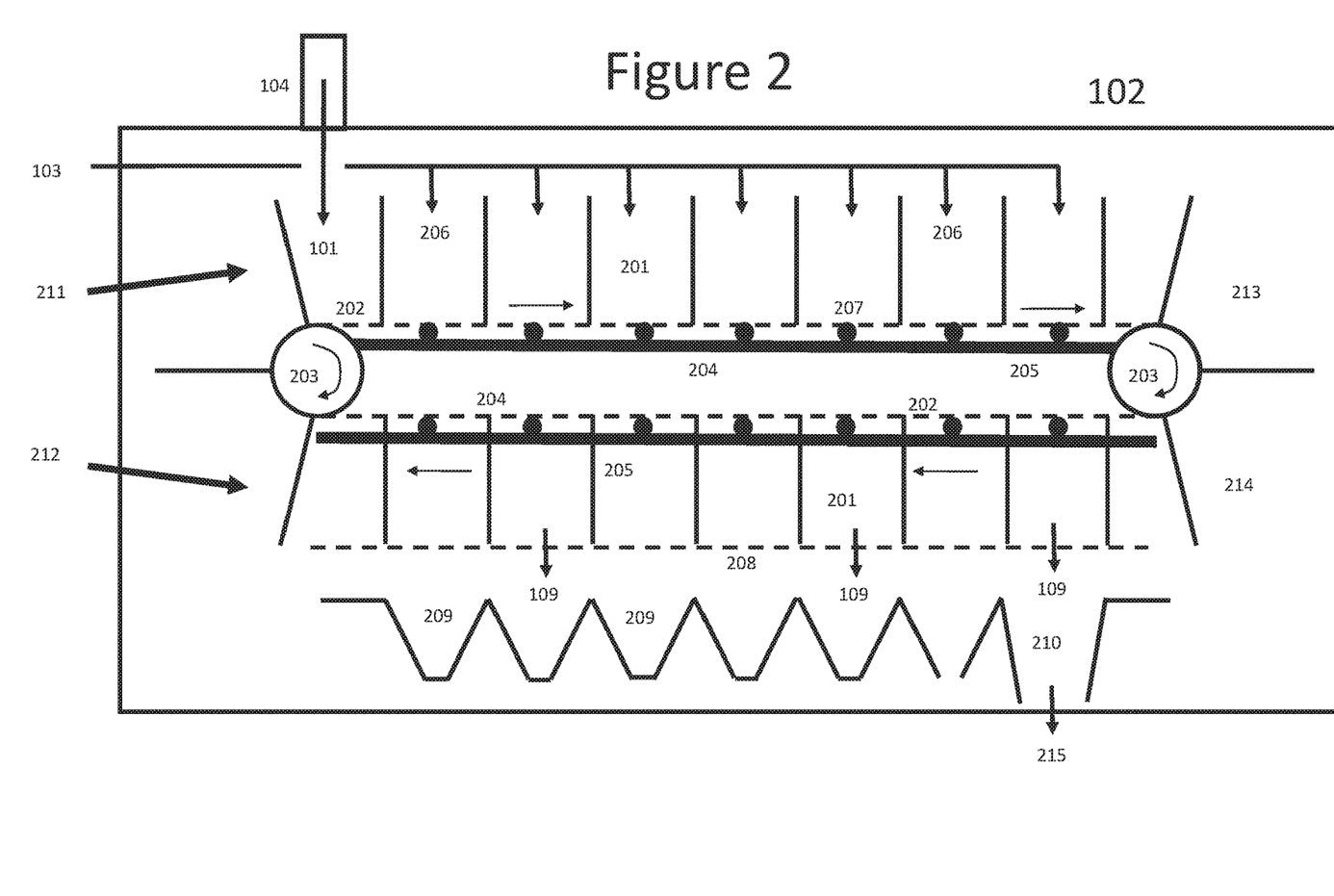
FIG. 2 is a schematic representation of the extractor, in accordance with one embodiment of the current invention.

A preferred counter current extractor 102 for use with the present invention is a multi-chamber sliding cell extractor. This type of extractor 102 includes a plurality of moving compartments or cells 201 that are pulled continuously through two or more separate chambers in which solvent media 103 can be applied to the seed flakes 101 being extracted. The cells 201 may be formed from three-sided segments that may be attached to and pulled by two or more conveyor chains 202. The chained segments 202 may be driven and guided by sprockets 203 at either end of the extraction device 102. One sprocket 203 may be motor driven while the other sprocket 203 is non-powered and serves as a guiding mechanism for the moving cells 201.

In another embodiment of the present invention, the chained segments 202 that are attached to the cells 201 is driven at both ends of the extraction device 102. This provides an even tension from both ends, thus reducing slack. This provides for easier installation, lower maintenance, no chain elongation over time, and less normal wear and tear.

In another embodiment of the present invention, the cells 201 utilize wheels 204 that travel along the top of a rail 205, thus eliminating friction between the bottom of the cell 201 and the fixed, slotted deck 207/208. This reduced routine wear and tear, thus reducing maintenance.

The seed flakes 101 to be extracted are contained in the moving cells 201 and the solvent 103 is applied to the seed flakes 101 through fixed nozzles 206 in the tops of the separate extraction compartments as required by the operation. The floor of the moving cells is formed by a fixed, slotted deck 207/208 which runs the length of each extraction chamber. The moving cells are formed when each chained segment 202 moves around the sprockets 203 and intersects the fixed, slotted deck 207/208 and the preceding segment. Typically, the cells 201 slide along the fixed slotted deck 207/208, thus introducing friction and wear.

Figure 3:
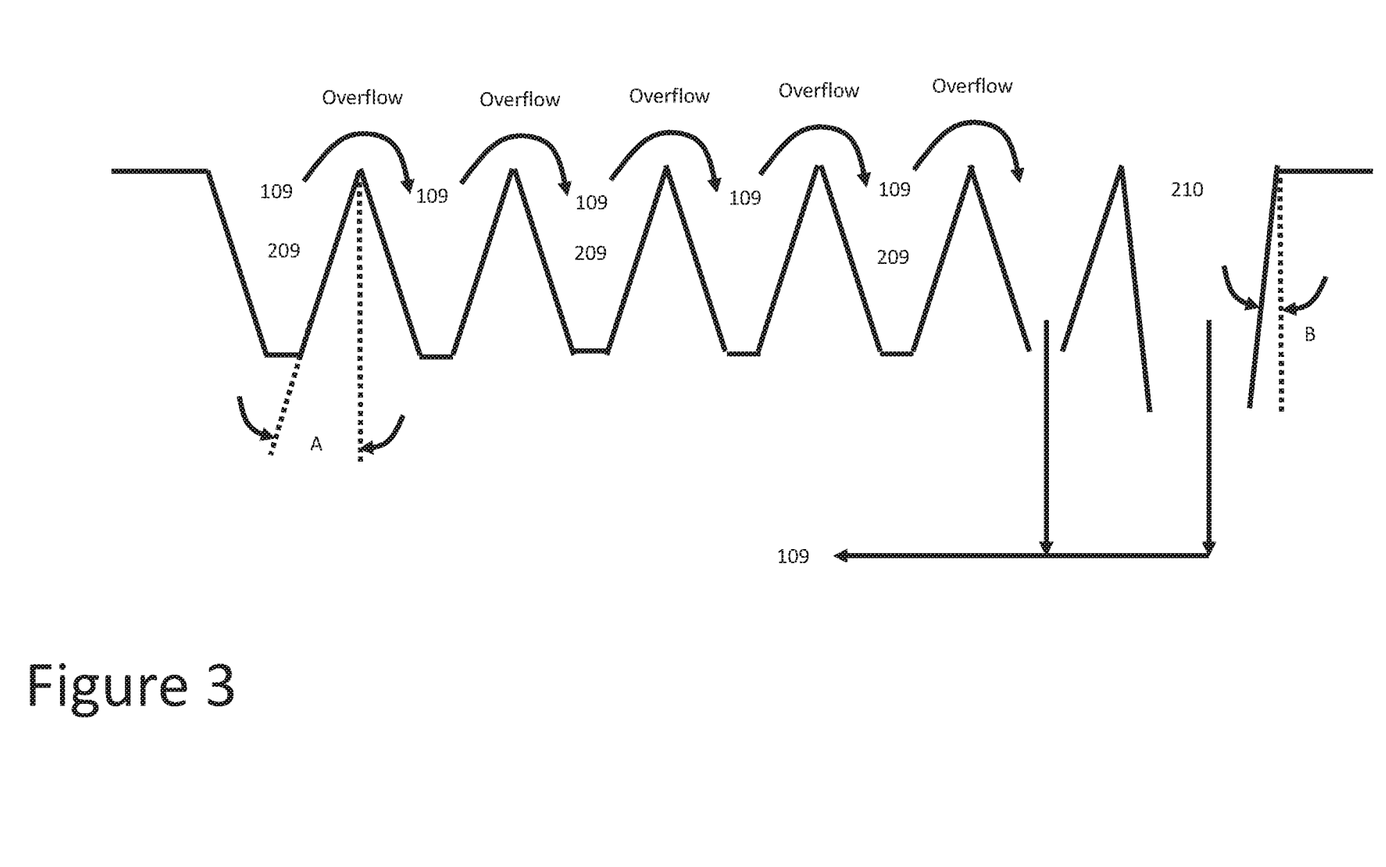
FIG. 3 is detailed schematic representation of the hoppers in the extractor, in accordance with one embodiment of the current invention.

Top extraction chamber 211 and bottom extraction chamber 212 of the extractor are formed by fixed walls and by top and bottom slotted decks 207/208. Each slotted deck 207/208 is drained by several separated hoppers 209/210, with one drainage pan employed in each stage of the extractor. The hoppers 210/211 are typically somewhat shallow, with a gentle slope. As the miscella 109 exiting the extractor 102 may have a very high fines content, this design can lead to fines accumulation and possibly clogging. The final hopper 210 is the most critical, as this is the hopper 209 into which the solvent soaked seed flakes are dropped. These are likewise typically shallow and thus prone to clogging.

The seed flakes 101 are distributed evenly in the cells 201. Initially, the filled cells 201 travel along the upper slotted deck 207, wherein it is introduced to the solvent 103. At the end of this path, the slotted deck turns downward, as illustrated by cells 213 and 214. From this point onwards, the cells 201 are bottomless. In this way, the partially extracted expanded meal falls from the above to the lower part of the slotted deck. The bottom of the system is formed by the lower slotted deck 208.

In another embodiment of the present invention, the hoppers 209 may have a much steeper angle A, thus providing a higher tolerance for fines. These hoppers 209 may have angles A of more than 25 degrees from the vertical.

In another embodiment of the present invention, the final hopper 210 may have a much steeper angle B, thus providing improved drainage and less prone to clog. This hopper 210 may have an angle B of more than 50 degrees from the vertical. To further improve the process, this hopper 210 may be isolated and a sub-atmospheric pressure induced to remove some solvent 103 from the flake meal.

Each moving cell 201 is filled with seed flakes 101 as it passes under the top feed mechanism 104 of the extractor unit 102. The extracted seed flakes 215 are discharged at the bottom discharge mechanism of the extractor unit 102

Figure 4:
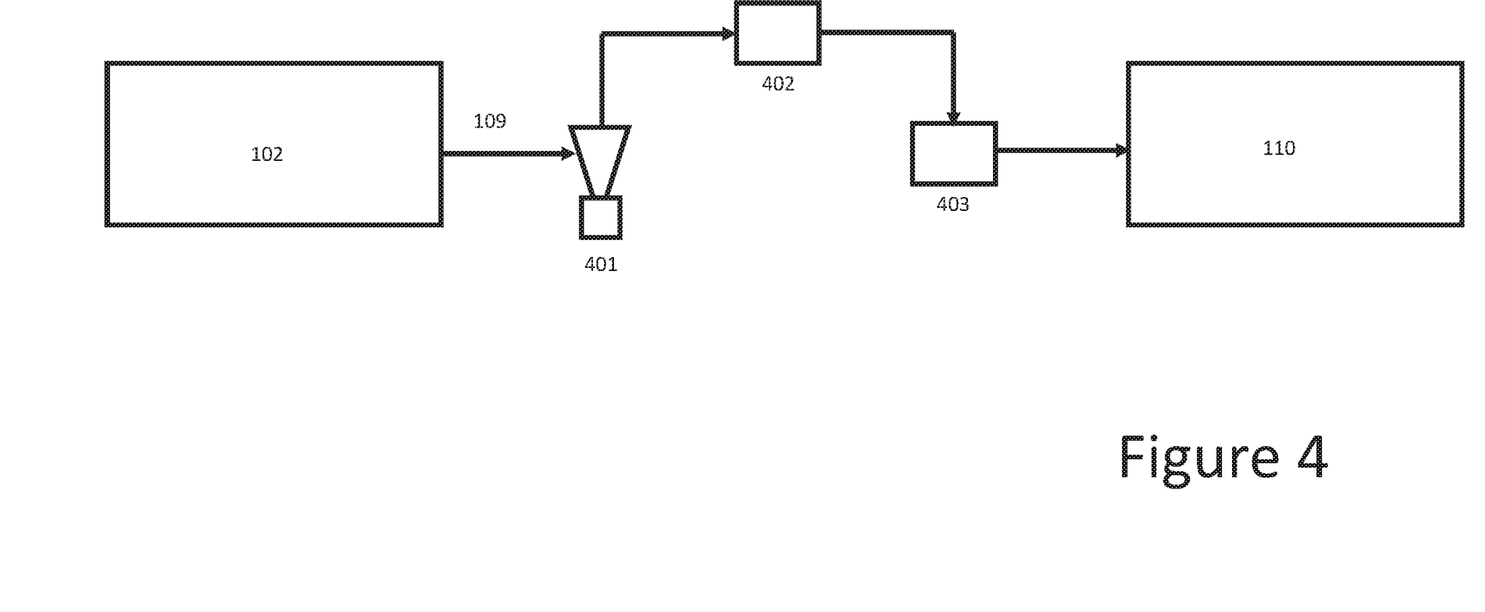
FIG. 4 is a schematic re presentation of the miscella treatment prior to introduction into the distillation system in accordance with one embodiment of the current invention.

In another embodiment of the present invention, a three stage fines removal may be utilized on the final miscella 109 stream after extraction. These three stages may consist of one or more hydrocyclones 401, one or more filters 402, and a settling tank 403. This adds flexibility to the system, especially if multiple seed feedstocks are to be used.

In another embodiment of the present invention, the hoppers 209 may have a much steeper angle A, thus providing a higher tolerance for fines. These hoppers 209 may have angles A of more than 25 degrees from the vertical.

In another embodiment of the present invention, the final hopper 210 may have a much steeper angle B, thus providing improved drainage and less prone to clog. This hopper 210 may have an angle B of more than 50 degrees from the vertical. To further improve the process, this hopper 210 may be isolated and a sub-atmospheric pressure induced to remove some solvent from the flake meal.

After exiting the extractor, the extracted seed flakes 215 are introduced into the top of a DTDC (Desolventizer-Toaster-Dryer-Cooler) 106. In another embodiment of the present invention, an airlock 107 may be provided between the extractor 102 and the DTDC 106. This would allow the extractor 102 to heat up (during startup) without requiring the DTDC 106 to be pressurized. This improves startup efficiency and increases operational safety.

At this time, the flakes 215 typically contain between 25 and 30 weight percent solvent (hexane). In another embodiment of the present invention, a separate pre-desolventizer 108 may be incorporated into the design upstream of the DTDC. This pre-desolventizer 108 may be able to reduce the solvent content of the wet meal 215 from 30-35% to about 15% by indirect contact with steam. This may account for significantly less steam usage. This may also reduce the loading of life steam in the toasting stage, and thus optimize the DTDC 106 design.

Figure 5:
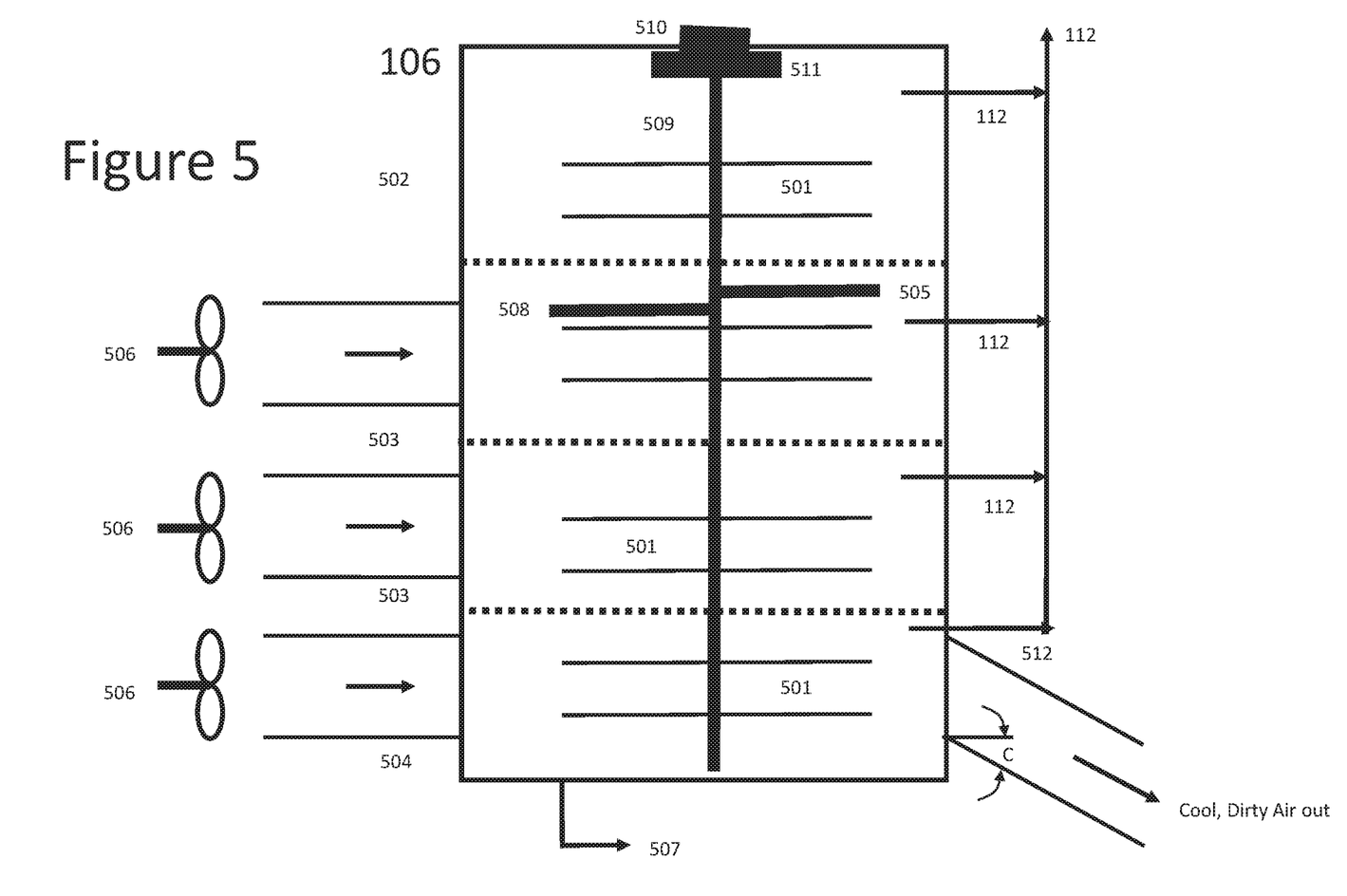
FIG. 5 is a schematic representation of the DTDC, in accordance with one embodiment of the current invention.

A typical DTDC column 106 has multiple trays 501. Typically, the DTDC 106 consists of one or more trays 501 in each of the following stages; pre-desolventizing 502, desolventizing-toasting (DT) 503, and drier-cooler (DC) 504. The uppermost trays may be either function as pre-desolventizers 502 or desolventizers 503. In these trays are heated by steam and the indirect heat from the hot surface causes the solvent to vaporize and exit through the top of the DTDC column 106

Typically, there may be a rotating device, such as a rotating arm 505, that levels out the flakes 215 in each tray 501. In the figure, a single rotating arm 505 is indicated, but it should be noted that each tray 501 may have such an arm, and these were excluded from this figure in the interest of clarity.

Figure 6:
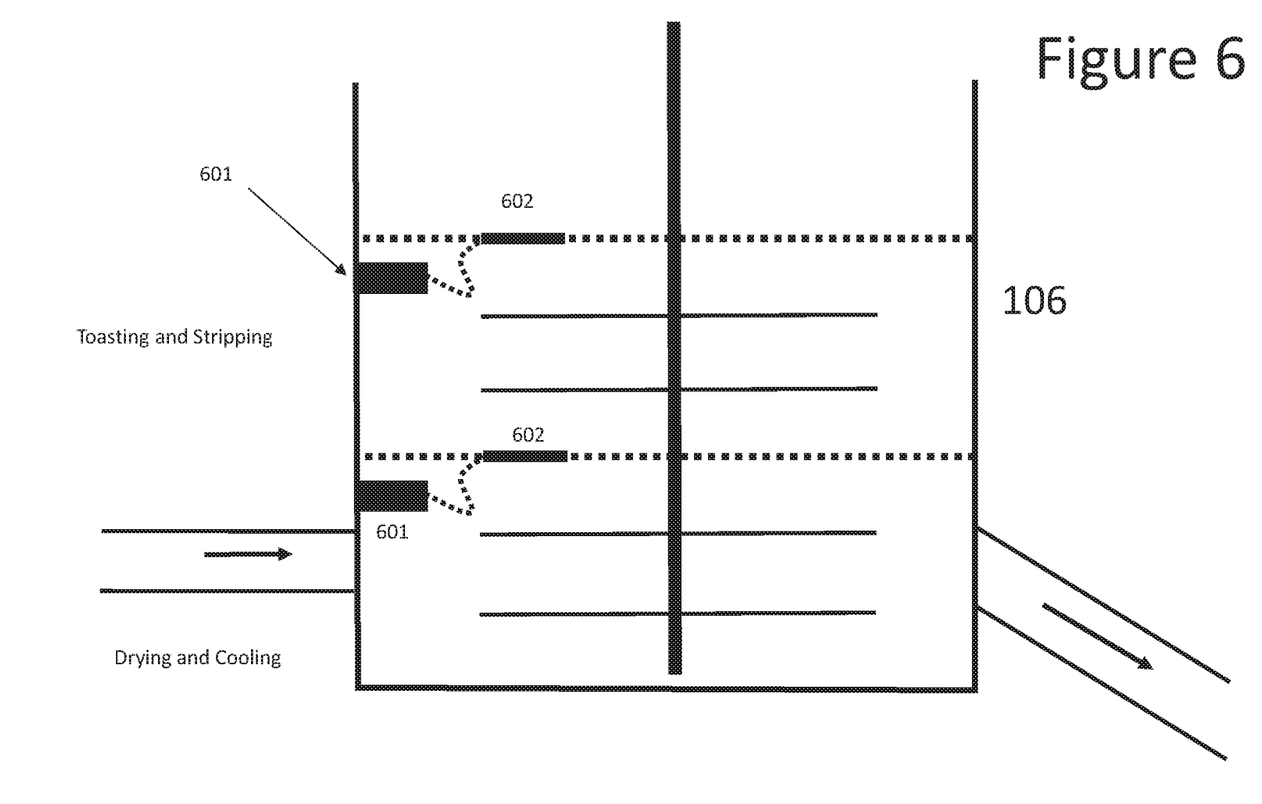
FIG. 6 is a detailed schematic representation of the DTDC, in accordance with one embodiment of the current invention.

Typically, the control of the level of the flakes 215 in any tray 501 is a purely mechanical, and therefore non-adjustable or remote controllable, procedure. In another embodiment of the present invention, the DTDC 106 may be equipped with electronic level controls 601 to monitor and adjust the level of each tray (deck) 501 to a predetermined level. This may be accomplished by means of a rotary valve 602 between each deck.

This predetermined level will vary with the overall throughput of the DTDC 106, as well as with the particular deck. For example, in the pre-desolventizing deck 502, the predetermined level of flakes may be less than 250 mm, preferably less than 200 mm, more preferably less than 150 mm. In the desolventizing deck 503, the predetermined level of flakes may be less than 1500 mm, preferably less than 1250 mm, and more preferably less than 1000 mm. In the toasting and stripping deck 503, the predetermined level of flakes may be less than 600 mm, preferably less than 500 mm, more preferably less than 400 mm. In the drying deck 504, the predetermined level of flakes may be less than 500 mm, preferably less than 400 mm, more preferably less than 300 mm.

The air flow to each of the dryer and/or cooler sections 504 of the DTDC 106 decks can be adjusted by means of individual fans 506 per deck. Each stage, in particular in the drier-cooler, may have its own blower. The deck operation may be adjustable to accommodate changes in production or feedstock.

The treated flakes 215 then fall to the next lower trays 501, which may be additional desolventizer trays 503. Each level (tray) 501 typically has a second rotating arm (sweep arm) 508 that moves the flakes around the tray 501 and into a passage into which the flakes pass and fall on the next lower tray 501.

The leveling arms 505 and sweep arms 508 are connected to a shaft 509, that is, in turn, connected to a drive motor 510. Typically, the shaft is only supported on the bottom. In one embodiment of the present invention, the DTDC shaft 509 is supported on the top 511. This reduces the weight on the motor coupling. This allows for improved reliability, safety and reduced equipment cost.

After essentially all of the solvent 103 has been volatized and removed as recycle stream 112, the flakes 215 then fall to a second set of trays called toaster trays 503. These trays 503 remove any remaining solvent, this time using hot air. This heats the flakes and cook them into a meal 507. As the meal 507, at this point, may contain considerable moisture, the next trays 504 dry the meal 507. And the final tray(s) 504 cool the meal 507, which then exits the DTDC 106. Typically, a DTDC may have 2 or 3 dryer stages and 1 cooler stage, all fed by the same fan. In another embodiment of the present invention, the air transfer ducts 512 exiting the dryer and/or cooler sections 504 of the DTDC 106 are specially designed with sloping walls and not flat spots or low points wherein fines may accumulate.

In another embodiment of the present invention, recycle stream 112 may be heated n heater 114. This allows for a fast, warm restart and improves overall efficiency.

The air transfer ducts 512 have walls and a nominal centerline that passes through the approximate center point of any radial cross section the duct. When "the lower half" of the air transfer duct is referenced, it is referring to the portion of the duct below the centerline, in the direction in which gravity increases. As used herein, with regard to the air transfer ducts, the term "sloping walls" is defined as meaning that, at least the lower half of the air transfer ducts have a slope C, in the axial direction, of less than horizontal, preferably slope C is more than 30 degrees less than horizontal, more preferably more than 45 degrees less than horizontal.

As used herein, with regard to the air transfer ducts 512, the term "having no low point" is defined as meaning that from the inlet, where the duct 512 attaches to the dryer and/or cooling section 504, to the outlet, the above defined slope is continuous and at no intermediate point does the slope reverse and create a local minimum or low spot. In a practical sense, there is no place within the air transfer duct for any solids or liquids that may be entrained in the flow to be trapped and accumulate.

As used herein, with regard to the air transfer ducts 512, the term "having no flat spot" is defined as meaning that from the inlet, where the duct attaches to the dryer and/or cooling section 504, to the outlet, the above defined slope is continuous and at no intermediate point is the slope reduced to zero (or horizontal). In a practical sense, there is no place within the air transfer duct for any solids or liquids that may be entrained in the flow to be trapped and accumulate.

After exiting the extractor 102, the miscella (solvent+seed oil) 109 is introduced into a distillation system 110.

The raw miscella 109 is then sent to one or more hydrocyclones 401, which separate the fines from the miscella. After the one or more hydrocyclones 401, the resulting miscella is then sent to full miscella filters 402. There are automatic metal edge filters to separate the remaining fines. All the fines are sent back to the extractor. After exiting miscella filters 402, the miscella may then enter a settling tank 403.

In another embodiment of the present invention, after exiting the hydrocyclones 401, filters 402, and settling tank 403, but prior to entering the miscella distillation system 110, the miscella may be introduced into a phase separator 111, thus removing any condensate, protein, and meal prior to entering the downstream system.

Good separation of fines from the miscella in front of miscella distillation ensures proper and efficient operation of the downstream equipment, in particular the distillation column.

Figure 7:
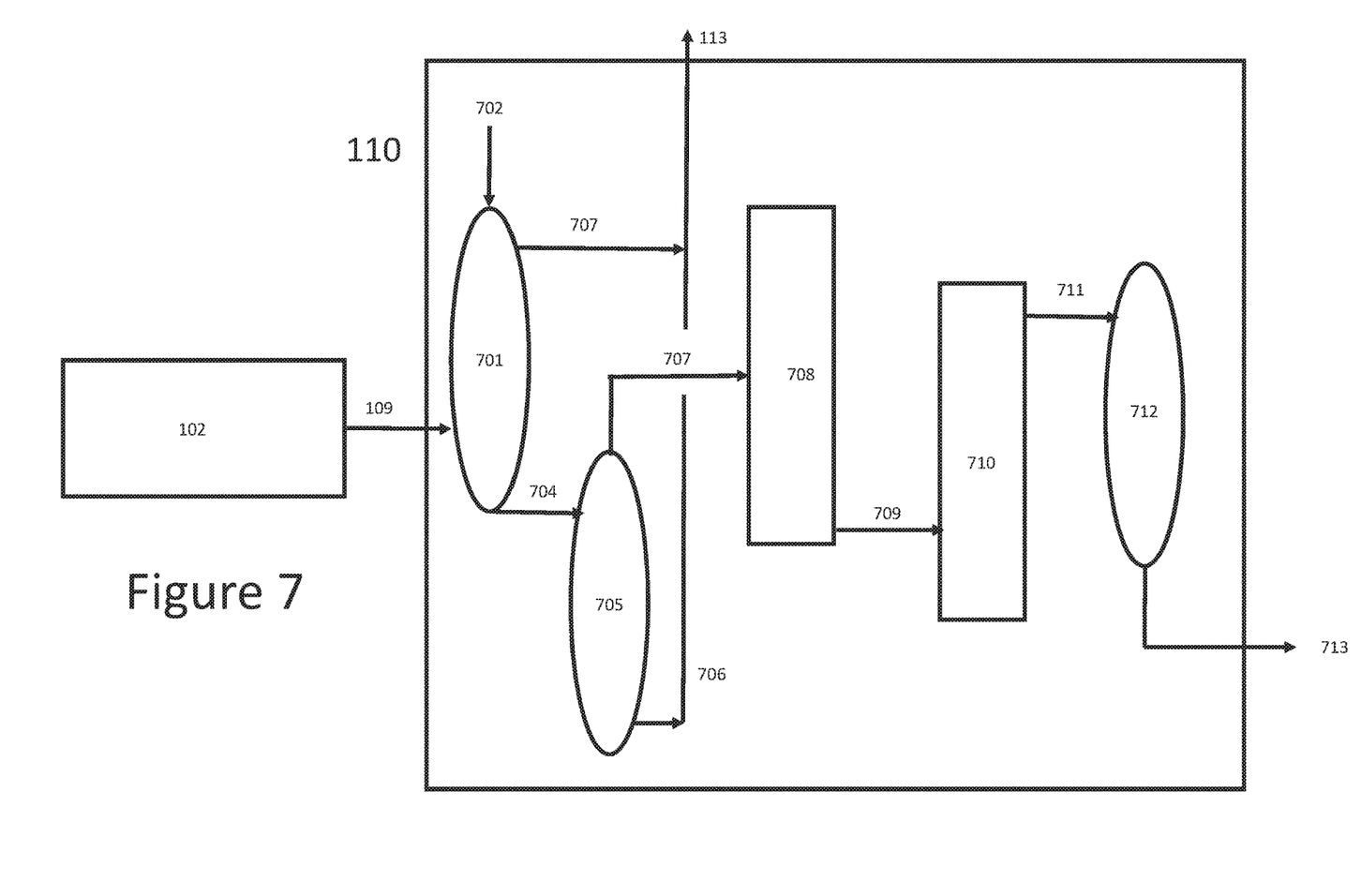
FIG. 7 is a schematic representation of the distillation system, in accordance with one embodiment of the current invention.

A certain amount of air enclosed in the pores of the processed seed flakes 215 is always supplied to the extractor 102. The air is saturated with solvent 103. This air is desolventised by absorption 701. The fine-free miscella may first be introduced into an absorption column 701 which acts to remove at least a portion of the solvent 103. The absorption column 701 may operate at a slight vacuum. The absorption column 701 may operate at a pressure of less than 7 psia, preferably less than 6 psia. Within the absorption column 701, cold mineral oil 702, also known as white oil, is introduced at the top. As the mineral oil 702 falls through the absorption column 701, it contacts rising vapors which contain solvent 103, which may be hexane. The resulting solvent 703 may be recycled The mineral oil/solvent mixture 704 is then introduced into a stripping column 705 where the solvent 103 is stripped again from the mineral oil 702. The stripping column 705 may operate at a slight vacuum. The stripping column 705 may operate at a pressure of less than 7 psia, preferably less than 6 psia. The stripping column 705 may operate at a temperature of less than 212 F, preferably less than 205 F. The stripped solvent 706 may be recycled.

In another embodiment of the present invention, solvent stream 703 and solvent stream 705 may be combined into recycle stream 113. Recycle stream 113 may be heated in heater 115. This allows for a fast, warm restart and improves overall efficiency.

At this point, the mineral oil and solvent mixture 707 is sent to one or more evaporator. The first evaporator may be a falling film evaporator 708. The condensate from the falling film evaporator 708 consists again of solvent and water and may be sent back to the solvent-water separator. The miscella entering at the top of the falling film evaporator is heated up and partial evaporated under vacuum. The resulting miscella 709 may then be sent to a rising film evaporator 710 where it's further evaporated.

The rising film evaporator 710 may operate at a slight vacuum. The rising film evaporator 710 may operate at a pressure of less than 7 psia, preferably less than 6 psia. The rising film evaporator 710 may operate at a temperature of less than 212 F.

The miscella 711 leaves the rising film evaporator 710 and is sent to a distillation column 712. The miscella 711 is heated with steam because a higher temperature is required to get rid of the remaining content of solvent in the oil. As miscella 711 is a mixture of oil and solvent, and sufficient solvent has now been removed that at this point, the stream may no longer, technically, be called miscella. This crude oil 713 may now be water-degummed and further refined.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for removing oil from seed flakes, comprising:
   a. Introducing seed flakes into an extractor, thereby producing an extracted seed flake stream and a miscella stream,
   b. Introducing the extracted seed flake stream into a DTDC column, thereby producing a first solvent recycle stream and a seed meal stream, and
   c. Introducing the miscella stream into a distillation system, thereby producing a second solvent recycle stream and a seed oil stream,
   wherein the first solvent recycle stream, the second solvent recycle stream, or both pass through a heater before being recycled to the extractor.

2. The method of claim 1, wherein the extractor further comprises drive sockets, and one or more cells that are attached to one or more conveyer chains, wherein the one or more conveyer chains are driven by the drive sockets at both ends of the extractor.

3. The method of claim 1, wherein the extractor further comprises one or more top rails, one or more cells comprising wheels that are configured to ride along the one or more top rails.

4. The method of claim 1, wherein the extractor further comprises one or more hoppers configured to receive the miscella stream, wherein the one or more hoppers have sides with angles of more than 25 degrees from the vertical.

5. The method of claim 1, wherein the extractor comprises a final hopper at one end of the extractor, and wherein the final hopper has sides with angles of more than 50 degrees from the vertical.

6. The method of claim 1, wherein the DTDC column comprises a top, and a shaft configured to support one or more trays, and wherein the shaft is supported at the top.

7. The method of claim 1, wherein the DTDC column comprises at least one dryer section and at least one cooler section, and wherein the at least one dryer section and/or the at least one cooler section comprises at least one air transfer duct comprising sloping walls and having no low point or flat spots where seed fines may accumulate.

8. The method of claim 1, wherein the DTDC column comprises one or more decks each of which comprises one or more trays upon which the seed flakes are dispersed, wherein each of the one or more decks comprises at least one electronic level indicator, and a valve between each of the one or more decks, wherein the level of the seed flakes on the one or more decks are controlled by opening or closing the respective valve until the at least one electronic level indicator senses a predetermined level.

9. The method of claim 1, wherein the DTDC column further comprises a separate pre-desolventizer located upstream of the DTDC.

10. The method of claim 1, wherein the DTDC column comprises one or more decks each of which comprises one or more trays upon which the seed flakes are dispersed, wherein each deck has a dedicated blower.

11. The method of claim 1, wherein the miscella stream is treated in a three-stage fines removal system after removal from the extractor, wherein the first-stage comprises one or more cyclonic separators, the second-stage comprises one or more filters, and the third stage comprises a settling tank.

12. The method of claim 9, wherein the second-stage filters are automatic metal edge filters.

13. The method of claim 1, wherein prior to entering the distillation system, the miscella is introduced into a phase separator.

14. The method of claim 1, wherein an air-lock is provided between the extractor and the DTDC, thus allowing the extractor to operate without requiring that the DTDC be pressurized.

* * * * *